United States Patent
Ratilainen et al.

(10) Patent No.: US 10,959,163 B2
(45) Date of Patent: Mar. 23, 2021

(54) RADIO NETWORK NODE, USER EQUIPMENT AND METHODS PERFORMED THEREIN

(71) Applicant: Telefonaktiebolaget LM Ericsson (publ), Stockholm (SE)

(72) Inventors: Antti Ratilainen, Espoo (FI); Andreas Höglund, Solna (SE); Ali Nader, Malmö (SE); Tuomas Tirronen, Helsinki (FI); Emre Yavuz, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/613,143

(22) PCT Filed: May 29, 2018

(86) PCT No.: PCT/SE2018/050532
§ 371 (c)(1),
(2) Date: Nov. 13, 2019

(87) PCT Pub. No.: WO2018/222112
PCT Pub. Date: Dec. 6, 2018

(65) Prior Publication Data
US 2020/0196222 A1    Jun. 18, 2020

Related U.S. Application Data

(60) Provisional application No. 62/512,199, filed on May 30, 2017.

(51) Int. Cl.
*H04W 4/00* (2018.01)
*H04W 48/12* (2009.01)
(Continued)

(52) U.S. Cl.
CPC ....... *H04W 48/12* (2013.01); *H04W 52/0229* (2013.01); *H04M 1/72519* (2013.01); *H04M 1/72522* (2013.01); *H04W 88/02* (2013.01)

(58) Field of Classification Search
CPC ............ H04W 48/12; H04W 52/0229; H04W 8/245; H04M 1/72519; H04M 1/72522
(Continued)

(56) References Cited

U.S. PATENT DOCUMENTS

| | | | | |
|---|---|---|---|---|
| 8,965,329 | B1* | 2/2015 | Jones | ...................... H04M 11/04 |
| | | | | 455/404.2 |
| 2011/0070900 | A1* | 3/2011 | Shi | ........................ H04W 68/00 |
| | | | | 455/458 |

(Continued)

FOREIGN PATENT DOCUMENTS

| | | |
|---|---|---|
| WO | 2015020583 A1 | 2/2015 |
| WO | 2016095820 A1 | 6/2016 |
| WO | 2017029265 A1 | 2/2017 |

OTHER PUBLICATIONS

3rd Generation Partnership Project, "3rd Generation Partnership Project; Technical Specification Group Radio Access Network; Evolved Universal Terrestrial Radio Access (E-UTRA); Multiplexing and Channel Coding (Release 14)", Technical Specification, 3GPP TS 36.212 V14.0.0, Sep. 1, 2016, pp. 1-148, 3GPP.
(Continued)

*Primary Examiner* — Danh C Le
(74) *Attorney, Agent, or Firm* — Coats & Bennett, PLLC

(57) ABSTRACT

Embodiments herein relate e.g. a method performed by a radio network node (12) for handling system information of a wireless communication network (1). The radio network node (12) transmits an indication to a UE (10), the indication associated with an update of system information of the wireless communication network (1), wherein the indication indicates a type of system information. The indication may
(Continued)

indicate whether the update regards critical system information being a first type of system information, or less critical system information being a second type of system information.

24 Claims, 11 Drawing Sheets

(51) Int. Cl.
*H04W 52/02* (2009.01)
*H04M 1/725* (2021.01)
*H04W 88/02* (2009.01)

(58) Field of Classification Search
USPC ...................................... 455/434, 550.1, 418
See application file for complete search history.

(56) References Cited

U.S. PATENT DOCUMENTS

| | | | | |
|---|---|---|---|---|
| 2012/0082125 A1* | 4/2012 | Huang | ................ | H04W 72/042 |
| | | | | 370/329 |
| 2014/0177591 A1* | 6/2014 | Dhanda | ............. | H04W 36/0022 |
| | | | | 370/331 |
| 2014/0241234 A1* | 8/2014 | Zhu | ..................... | H04W 72/005 |
| | | | | 370/312 |
| 2014/0321381 A1* | 10/2014 | Guo | ................. | H04W 52/0216 |
| | | | | 370/329 |
| 2015/0305041 A1* | 10/2015 | Kim | ..................... | H04L 5/0037 |
| | | | | 370/329 |
| 2015/0365914 A1* | 12/2015 | Yu | ........................ | H04B 10/112 |
| | | | | 455/458 |
| 2016/0226922 A1* | 8/2016 | Russell | ............... | H04L 65/1016 |
| 2016/0262130 A1* | 9/2016 | Johansson | ........... | H04L 41/0672 |
| 2017/0086131 A1* | 3/2017 | Gupta | ............... | H04W 36/0061 |
| 2017/0311290 A1* | 10/2017 | Adjakple | ................ | H04W 4/06 |
| 2017/0374491 A1 | 12/2017 | Xiao et al. | | |
| 2018/0035468 A1* | 2/2018 | Ishii | .................. | H04W 74/0833 |
| 2018/0063815 A1* | 3/2018 | Ishii | ...................... | H04W 48/12 |
| 2018/0167918 A1* | 6/2018 | Ishii | .................... | H04W 72/042 |
| 2018/0234826 A1* | 8/2018 | Maattanen | .............. | H04W 4/90 |
| 2018/0376407 A1* | 12/2018 | Myhre | .................. | H04W 48/16 |
| 2020/0221508 A1* | 7/2020 | Huang | .................. | H04W 68/02 |

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol Specification (Release 14)", Technical Specification, 3GPP TS 36.331 V14.0.0, Sep. 1, 2016, pp. 1-644, 3GPP.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14)", Technical Specification, 3GPP TS 36.300 v14.0.0, Sep. 1, 2016, pp. 1-314, 3GPP.

* cited by examiner

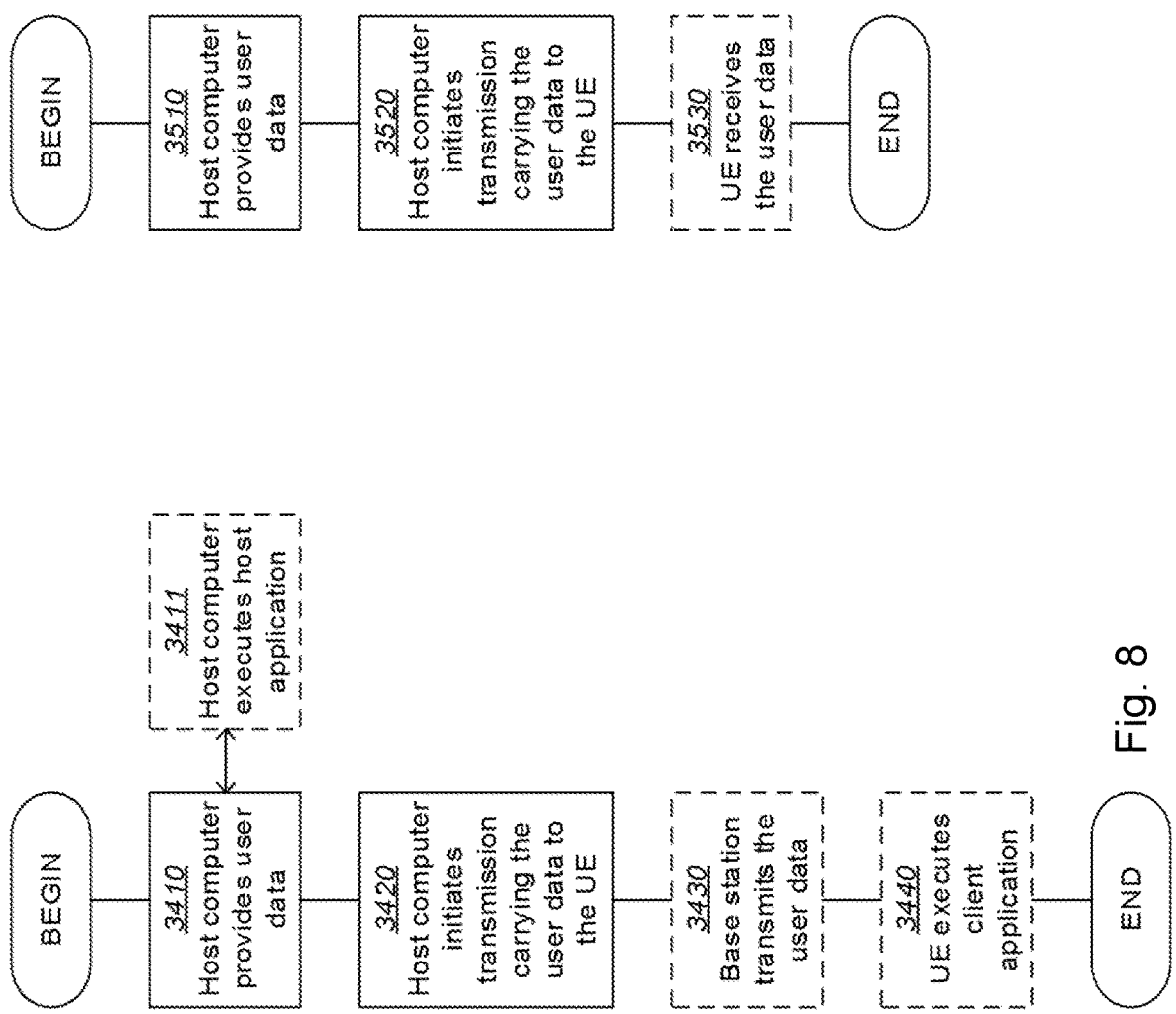

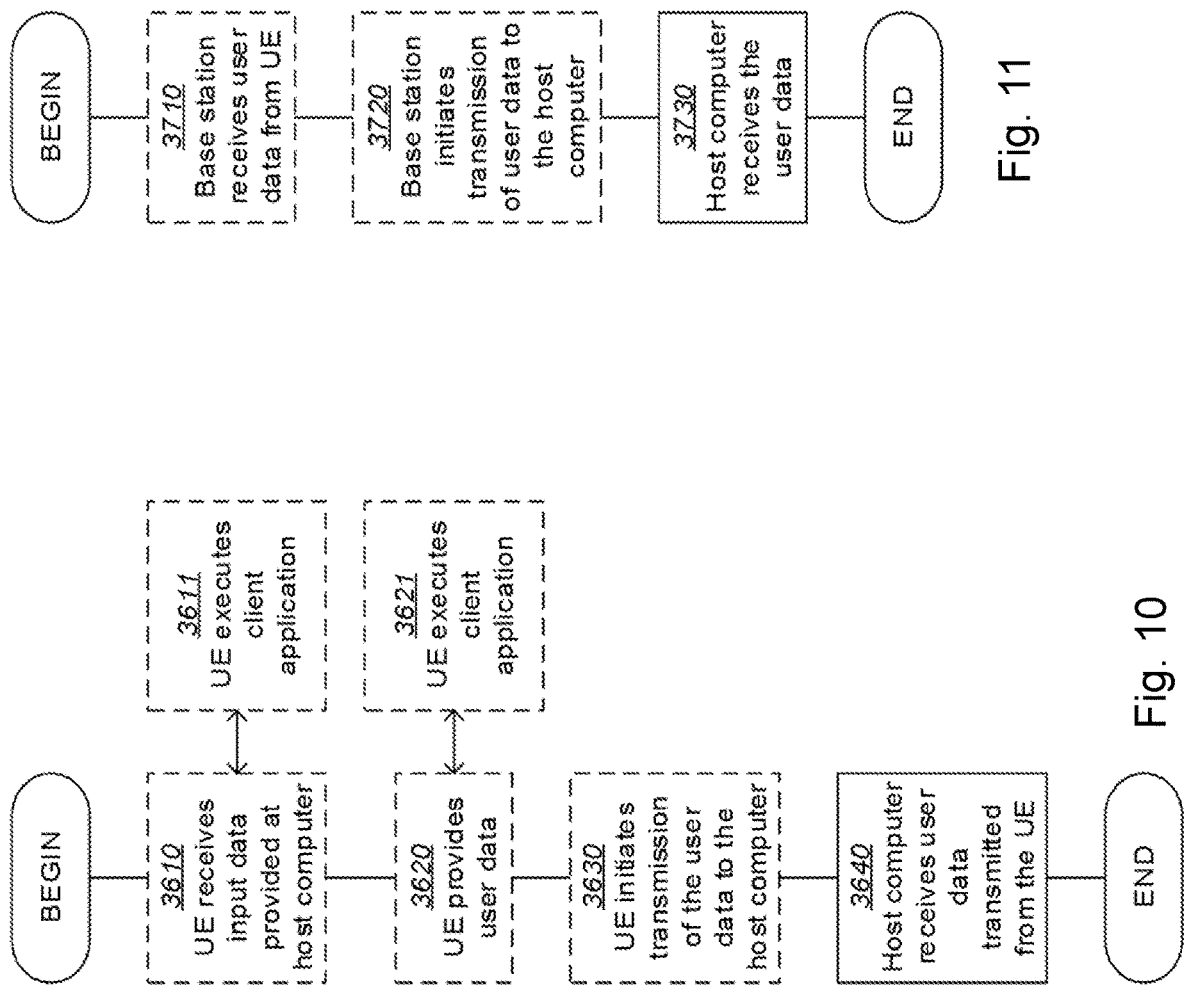

RADIO NETWORK NODE, USER EQUIPMENT AND METHODS PERFORMED THEREIN

TECHNICAL FIELD

Embodiments herein relate to a radio network node, a user equipment (UE) and methods performed therein. Furthermore, a computer program product and a computer readable storage medium are also provided herein. In particular, embodiments herein relate to enable communication of the UE e.g. handling system information, in a wireless communication network.

BACKGROUND

In a typical wireless communication network, user equipments (UE), also known as wireless communication devices, mobile stations, stations (STA) and/or wireless devices, communicate via a Radio Access Network (RAN) to one or more core networks (CN). The RAN covers a geographical area and provides radio coverage over service areas or cells, which may also be referred to as a beam or a beam group, with each service area or beam being served or controlled by a radio network node such as a radio access node e.g., a Wi-Fi access point or a radio base station (RBS), which in some networks may also be denoted, for example, a gNode B, a NodeB, or an eNodeB. The radio network node communicates over an air interface operating on radio frequencies with the user equipment within range of the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for UEs. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3$^{rd}$ Generation Partnership Project (3GPP) and this work continues in the coming 3GPP releases, for example to specify a Fifth Generation (5G) network and future generation networks. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

There has been a lot of work in 3GPP lately on specifying technologies to cover Machine-to-Machine (M2M) and/or Internet of Things (IoT) related use cases. 3GPP Releases 13 and 14 include enhancements to support Machine-Type Communications (MTC) with new UE categories, denoted as Cat-M1 and Cat-M2, supporting reduced bandwidth of up to 6 and 24 physical resource blocks (PRBs), and to support Narrowband IoT (NB-IoT) UEs providing a new radio interface, and UE categories denoted as Cat-NB1 and Cat-NB2.

LTE enhancements introduced in 3GPP Release 13, 14 and 15 for MTC are referred to as "eMTC", including (not limiting) support for bandwidth limited UEs, denoted Cat-M1 UEs, and support for coverage enhancements. This is to separate the discussion from NB-IoT (notation here used for any Release), although the supported features of eMTC and NB-IoT are similar on a general level.

There are multiple differences between regular LTE and the procedures and channels defined for eMTC and NB-IoT. Some important differences include new physical channels, such as the physical downlink control channels (PDCCH), called MPDCCH in eMTC and NPDCCH in NB-IoT, and a new physical random access channel (PRACH) denoted as NPRACH for NB-IoT. For system information (SI), both eMTC and NB-IoT, there is no dynamic scheduling of either System Information Block one-Bandwidth Reduced (SIB1-BR)/System Information Block one-Narrowband (SIB1-NB), scheduling information included in Master Information Block (MIB)/Master Information Block-Narrowband (MIB-NB), or system information messages, fixed scheduling inside system information window provided in SIB1-BR/SIB1-NB. Both eMTC and NB-IoT support coverage enhancements and the UE may have to accumulate several repetitions of system information broadcast in order to be able to successfully decode it. This means that system information acquisition time will in practice be longer the worse coverage the UE is in. In order to combat this, more dense repetitions for some physical channels and system information were introduced in eMTC and NB-IoT Release 13. The drawback of this is an increase in system overhead, i.e. more radio resources are consumed by continuous ("always-on") control signaling broadcast. The system acquisition procedure is in general the same for eMTC and NB-IoT as for LTE. The UE first achieves downlink synchronization by reading Primary Synchronization Signal (PSS)/Secondary Synchronization Signal (SSS), then it reads MIB, then SIB1, and finally the SI-messages are acquired, each possibly containing multiple SIBs.

For eMTC and NB-IoT UEs, the system information is considered to be invalid 24 hours after it was successfully considered to be valid. For "normal" UEs the system information is considered to be invalid after 3 hours. It is also possible to configure eMTC and NB-IoT to use the 3 hours validity range by using parameter si-ValidityTime [TS 36.331 v. 14.0.0].

During Release 14 some problems related to long system information acquisition time were identified by working group (WG) RAN4. Reducing the system acquisition time is also one of the agreed work item objectives for Release 15, which is common to both eMTC and NB-IoT such as:

Improved Latency:

Reduced system acquisition time

Improved cell search and/or system information (including MIB and SIB1-BR) acquisition performance System information change can be indicated to UEs by using Paging message, according to TS 36.331 v.14.0.0. The Paging message is used to inform UEs in RRC_IDLE state and UEs in RRC_CONNECTED state about a system information change. If the UE is in RRC_CONNECTED or is not configured to use a Discontinuous Reception (DRX) cycle longer than the modification period in RRC_IDLE state, and receives a Paging message including the systemInfoModification, it knows that the system information will change at the next modification period boundary. A UE in RRC_IDLE state that is configured to use a DRX cycle longer than the modification period, and receives in an eDRX acquisition period at least one Paging message including the systemInfoModification-eDRX, shall acquire the updated system information at the next eDRX acquisition period boundary. Although the UE may be informed about changes in system information, no further details are provided, except if systemInfoValueTagSI is received by UEs or UEs in Coverage Enhancement (CE).

Also, the system information change can be indicated using Direct Indication Information, as stated below for eMTC:

Direct Indication information is transmitted on MPDCCH using Paging-Radio Network Temporary Identifier (P-RNTI) but without associated Paging message. Table 6.6-1 defines the Direct Indication information, see TS 36.212 [22, 5.3.3.1.14] v.14.0.0.

When bit n is set to 1, UE shall behave as if the corresponding field is set in the Paging message. Bit 1 is the least significant bit.

TABLE 6.6-1

Direct Indication information

| Bit | Direct Indication information |
|---|---|
| 1 | systemInfoModification |
| 2 | etws-Indication |
| 3 | cmas-Indication |
| 4 | eab-ParamModification |
| 5 | systemInfoModification-eDRX |
| 6, 7, 8 | Not used, and shall be ignored by UE if received. |

Likewise, there is Direct Indication information also for NB-IoT:

Direct Indication information is transmitted on NPDCCH using P-RNTI but without associated Paging-NB message. Table 6.7.5-1 defines the Direct Indication information, see TS 36.212 v.14.0.0.

When bit n is set to 1, the UE 10 may behave as if the corresponding field is set in the Paging-NB message. Bit 1 is the least significant bit.

TABLE 6.7.5-1

Direct Indication information

| Bit | Field in Direct Indication information |
|---|---|
| 1 | systemInfoModification |
| 2 | systemInfoModification-eDRX |
| 3, 4, 5, 6, 7, 8 | Not used, and shall be ignored by UE if received |

For eMTC and NB-IoT UEs, one important aspect is extended battery life. Currently the UEs are required to acquire the system information upon receiving notification about system information change, which increases the battery consumption. There may be cases, where the network system information is changing relatively often, i.e. more often than the UEs in the system would actually need for transmissions. This leads to an inefficient signalling behaviour of the UE increasing the power consumption at the UE.

SUMMARY

An object herein is to provide a mechanism for acquiring system information in a more energy efficient manner.

According to an aspect the object is achieved by providing a method performed by a UE for handling system information of a wireless communication network. The UE receives an indication associated with an update of system information of the wireless communication network, wherein the indication indicates a type of system information. The UE further determines whether to retrieve the updated system information or not based on the indicated type of system information.

According to another aspect the object is achieved by providing a method performed by a radio network node for handling system information of a wireless communication network. The radio network node transmits to a UE, an indication associated with an update of system information of the wireless communication network, wherein the indication indicates a type of system information.

It is furthermore provided herein a computer program product comprising instructions, which, when executed on at least one processor, cause the at least one processor to carry out any of the methods above, as performed by the user equipment or the radio network node. It is additionally provided herein a computer-readable storage medium, having stored thereon a computer program product comprising instructions which, when executed on at least one processor, cause the at least one processor to carry out the method according to any of the methods above, as performed by the user equipment or the radio network node.

According to another aspect the object is achieved by providing radio network node for handling system information of a wireless communication network. The radio network node is configured to transmit to a user equipment, an indication associated with an update of system information of the wireless communication network, wherein the indication indicates a type of system information.

According to another aspect the object is achieved by providing a user equipment for handling system information of a wireless communication network. The user equipment is configured to receive an indication associated with an update of system information of the wireless communication network, wherein the indication indicates a type of system information. The user equipment is also configured to determine whether to retrieve the updated system information or not based on the indicated type of system information.

According to another aspect the object is achieved by providing a radio network node comprising processing circuitry configured to transmit to a user equipment, an indication associated with an update of system information of a wireless communication network, wherein the indication indicates a type of system information.

According to another aspect the object is achieved by providing a user equipment comprising processing circuitry configured to receive an indication associated with an update of system information of a wireless communication network, wherein the indication indicates a type of system information. The processing circuitry is also configured to determine whether to retrieve the updated system information or not based on the indicated type of system information.

Embodiments herein enable an increased battery lifetime for the UEs since the UE may spend more time "sleeping", i.e. not acquiring frequently modified system information since embodiments herein provide an improved way of acquiring system information in an energy efficient manner.

BRIEF DESCRIPTION OF THE DRAWINGS

Embodiments will now be described in more detail in relation to the enclosed drawings, in which:

FIGS. 8-11 are flowcharts illustrating methods implemented in a communication system including a host computer, a base station and a user equipment.

DETAILED DESCRIPTION

Figure 1:
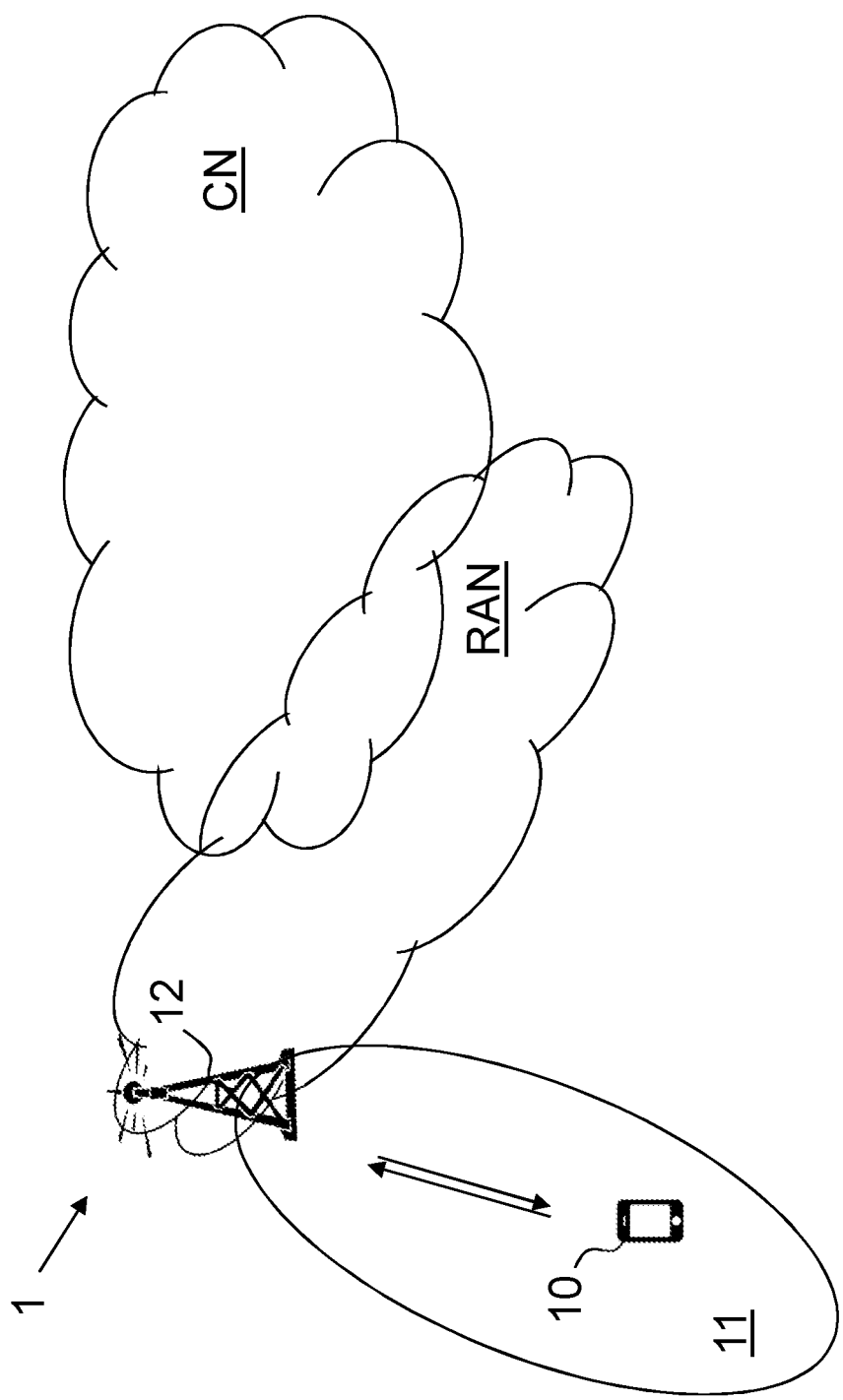
FIG. 1 is a schematic diagram depicting a wireless communication network according to embodiments herein.

Embodiments herein relate to wireless communication networks in general. FIG. 1 is a schematic overview depicting a wireless communication network 1. The wireless communication network 1 comprises one or more RANs and one or more CNs. The wireless communication network 1 may use one or a number of different technologies, such as New Radio (NR), Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication networks such as e.g. WCDMA and LTE.

In the wireless communication network 1, a user equipment 10, such as a wireless device, a mobile station, a non-access point (non-AP) STA, a station (STA) and/or a wireless terminals, may communicate via one or more Access Networks (AN), e.g. a RAN, to one or more core networks (CN). It should be understood by the skilled in the art that "user equipment" is a non-limiting term which means any terminal, wireless communications terminal, Machine Type Communication (MTC) device, Device to Device (D2D) terminal, or node e.g. smart phone, laptop, mobile phone, sensor, relay, mobile tablets or even a small base station communicating within a service area.

The wireless communication network 1 comprises a radio network node 12 providing radio coverage over a geographical area referred to as service area 11 or cell, which may be provided by one or more beams or a beam group where the group of beams is covering the service area of a first radio access technology (RAT), such as NR, 5G, LTE, Wi-Fi or similar. A radio network node, such as the radio network node 12, may also serve multiple cells. The radio network node 12 may be a transmission and reception point e.g. a radio-access network node such as a Wireless Local Area Network (WLAN) access point or Access Point Station (AP STA), an access controller, a base station e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a user equipment within the service area served by the radio network node depending e.g. on the radio access technology and terminology used. The radio network node 12 communicates with the user equipment with Downlink (DL) transmissions to the user equipment 10 and Uplink (UL) transmissions from the user equipment 10.

UEs may be required to receive updated system information multiple times in between its transmissions and the previously acquired system information may become obsolete without the UE ever needing to use that. This is especially the case, if the change in the system information is access related, i.e. only needed when the UE is initiating access. Acquiring unnecessary updates of system information causes unnecessary active time for the UE when receiving such updated system information too often, which translates into reduced battery lifetime. Currently, the UE would need at least to read MIB/SIB1 for eMTC and MIB-NB for NB-IoT for the SI specific value tags to know, which SI has been modified, which could take relatively long time to acquire. The problem is emphasized in bad coverage where system information acquisition takes longer time.

Illustrated embodiments herein are using NB-IoT and eMTC as example radio access technologies (RAT), since reduced power consumption is crucial for those RATs. However embodiments herein may be generalized to apply to other RATs e.g. using paging scheduled notification of SI modification as well.

System information (SI) can be categorized into at least e.g. two types (parts): General SI and less critical SI.

General SI, also referred to as critical SI, comprises information such as paging information and/or downlink bandwidth and paging configuration e.g. paging cycle and narrowband to use for paging, and is needed for when the network is contacting the UE 10, and the UE 10 should be accessible when the network expects it to be, therefore the UE 10 should always have up-to-date information on this type of SI.

Less critical SI, such as access related system information also referred to as initiating access information, is needed only when the UE 10 is initiating access, e.g. information such as PRACH configuration, or during mobility procedures. Since the information is only needed when the UE is initiating access or in a mobility procedure, it is not necessary for the UE 10 to receive this information right away when it is modified, but the UE 10 can wait to receive it when it is about to perform access.

The types or sets of SI may be fixed, or may be configurable, for example using Radio Resource Control (RRC) signalling. This way the radio network node 12 may have means to configure exactly which system information the UE 10 acquires immediately upon SI change notification and which system information the UE 10 acquires later when the UE 10 is accessing the wireless communication network or is moving between cells.

As seen previously in Table 6.6-1, from the 3GPP specification 36.331 v.14.0.0, for eMTC, there are 3 spare bits in the Direct Indication information, and two of the reserved bits may be allocated for systemInfoModification and systemInfoModification-eDRX, which inform UEs of system information change. Likewise, in Table 6.7.5-1, for e.g. NB-IoT it can be seen that there are 6 spare bits and two of the reserved bits may be allocated for systemInfoModification and systemInfoModification-eDRX.

One of the spare bits, being an example of an indication, may be used to indicate whether the system information modification is related to less critical SI only, such as SI related to initiating access from the UE 10. If this bit is set, the UE 10 may refrain from receiving the updated system information until the UE 10 is about to perform access, by then, there may be another modification for this SI possibly making the previous modification obsolete.

In one embodiment, another one of the spare bits may be used. In this case, one bit may indicate whether less critical SI is modified and another bit may indicate whether general SI is modified. In case both bits are set, the UE 10 may only receive the modified general SI, and delay the less critical SI acquisition until it is needed, i.e. when it needs to perform access due to a pending uplink transmission. An example table of Table 6.6-1 with the two new indication bits, underlined, is shown below.

TABLE 6.6-1

Direct Indication information

| Bit | Direct Indication information |
|---|---|
| 1 | systemInfoModification |
| 2 | etws-Indication |
| 3 | cmas-Indication |
| 4 | eab-ParamModification |
| 5 | systemInfoModification-eDRX |
| 6 | lessCriticalSystemInfoModification |
| 7 | generalSystemInfoModification |
| 8 | Not used, and shall be ignored by UE if received. |

Another example of a less critical SI is mobility related system information which is only needed when the UE 10 is a mobile device or in situations when it is in need of finding other more suitable cells to camp on. In one embodiment, the one spare bit, or another independent spare bit may be used to indicate if mobility related SI has changed. The mobility related SI may include for example SIBs ranging from SIB3 to SIB8. The UE may have RRC-configured thresholds for triggering measurement events and reporting for mobility purposes. This controls whether the UE 10 should perform neighbor cell measurements and reporting of this measurements or not. With this indication the UE 10, who might not need to perform measurements may delay the acquisition of these mobility related SIs for later. This can be further applied to a scenario, where there are stationary (and possibly mobile) UEs, which are aware of this property. Stationary UEs as well as mobile UEs in good coverage would not need to read any mobility related SIs, therefore with this indication those UEs can avoid reading SI they have no use for. For example, bit 8 of Table 6.6-1 above may be used to indicate mobilityRelatedSystemInfoModification.

In another embodiment, a timer may be introduced to control the maximal time the UE 10 can postpone the acquisition of less critical SI. That is, the UE 10 is allowed to postpone the acquisition of such SI until the subsequent access attempt as long as the timer has not expired. I.e. the timer may be started every time when there is a SI updated for which the less critical indication is used. When the UE 10 makes an access attempt and acquires the previously updated SI, the timer is stopped. If the timer expires, the UE will have to acquire the previously updated SI even though it has not yet made an access attempt. This will give the network larger freedom to label SI updates as less critical to provide increased battery life, without running the risk of having UEs in the system with outdated SI for all future time. This timer may be applied any scenario mentioned above, e.g. also to the mobility related SI indication.

Figure 2A:
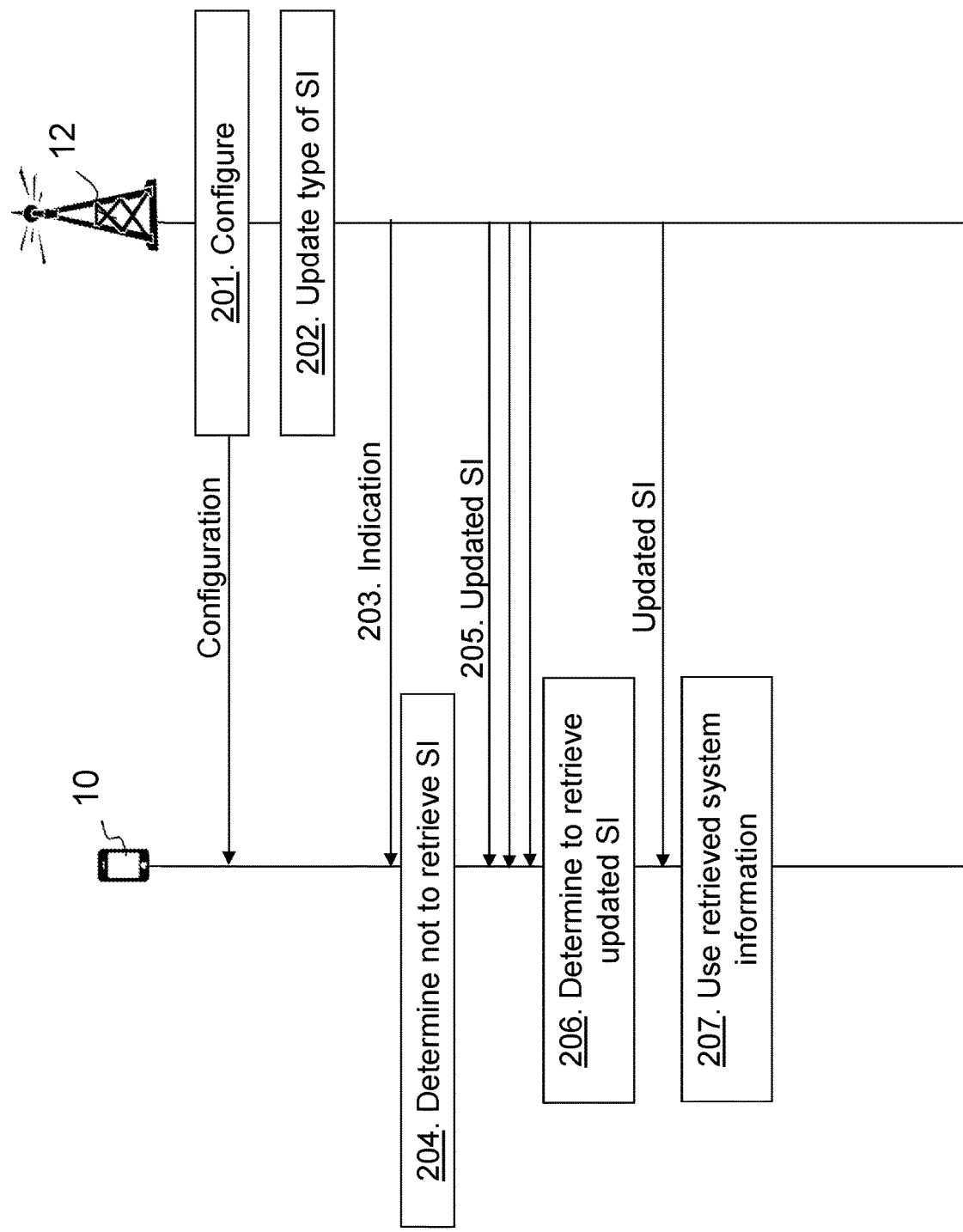
FIG. 2a is a combined flowchart and signalling scheme according to embodiments herein.

FIG. 2*a* is a combined flowchart and signaling scheme according to some embodiments herein.

Action 201.

The radio network node 12 may configure the UE 10 with types or parts of SI. For example, the SI may be divided into types or sets defined by level of being critical. The SI may be divided into at least two parts: critical information and less critical information. Critical information may relate to information enabling the radio network node 12 to contact the UE 10, and less critical information may relates to information enabling the UE 10 to initiate access to the radio network node 12 or enabling the UE 10 to move between cells such as mobility information. These groups or parts of SI may be preconfigured at the UE 10.

Action 202.

The radio network node 12 determines to update a part of the SI, e.g. less critical SI such as accessing information.

Action 203.

The radio network node 12 transmits the indication indicating the type of updated SI. The radio network node 12 may further transmit an update indication indicating that the SI information has been updated. The indication may be a bit in direct indication information indicating a certain type such as initiating access information, mobility information, or general SI which is an example of critical system information such as paging information.

Action 204.

The UE 10 then receives the indication and determines whether the update is relevant for the UE 10. For example, if the indication indicates that random access information or mobility information has been updated, i.e. less critical SI, the UE may determine that this update is not needed at the moment and determine not to retrieve the updated SI. Thus, the UE 10 determines based on the received indication whether to retrieve the updated SI or not. Furthermore, the UE 10 may further take into account a timer controlling maximum time to omit retrieving updated SI.

Action 205.

The radio network node 12 may periodically transmit the updated SI.

Action 206.

The UE 10 may then at a later time e.g. determine to transmit UL data or that the received signal strength or quality is below a threshold and thus to retrieve the updated SI. The UE 10 then retrieves the updated SI.

Action 207.

The UE 10 then uses the retrieved SI, e.g. performing random access or initiates a handover procedure using parameter(s) in the retrieved SI.

Thus, embodiments herein provide the indication e.g. a one or multi bit indicator in e.g. the direct indication information, wherein the indication indicates whether the system information modification is related to less critical information such as initiating access related system information or not.

Figure 2B:
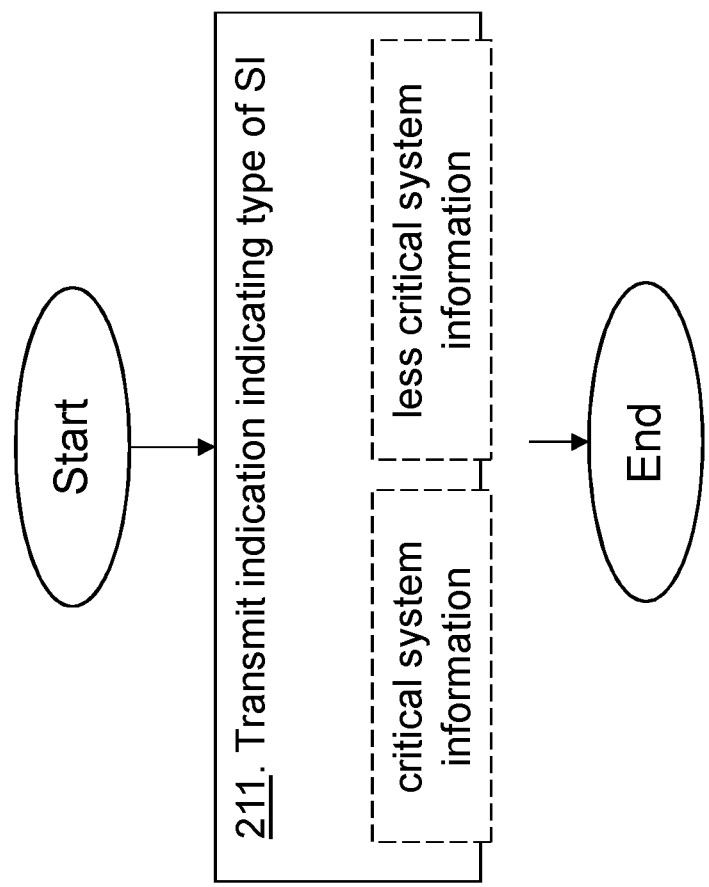
FIG. 2b is a flowchart depicting a method performed by a radio network node according to embodiments herein.

The method actions performed by the radio network node 12 for handling system information of the wireless communication network 1 according to embodiments will now be described with reference to a flowchart depicted in FIG. 2b. The actions do not have to be taken in the order stated below, but may be taken in any suitable order. Actions performed in some embodiments are marked with dashed boxes.

Action 211.

The radio network node 12 transmits to the UE 10, the indication associated with an update of system information of the wireless communication network 1, wherein the indication indicates a type of system information. The indication may indicate whether the update regards critical system information being a first type of system information, or less critical system information being a second type of system information. The less critical system information may comprise initiating access information, and the critical system information may comprise paging information.

Figure 2C:
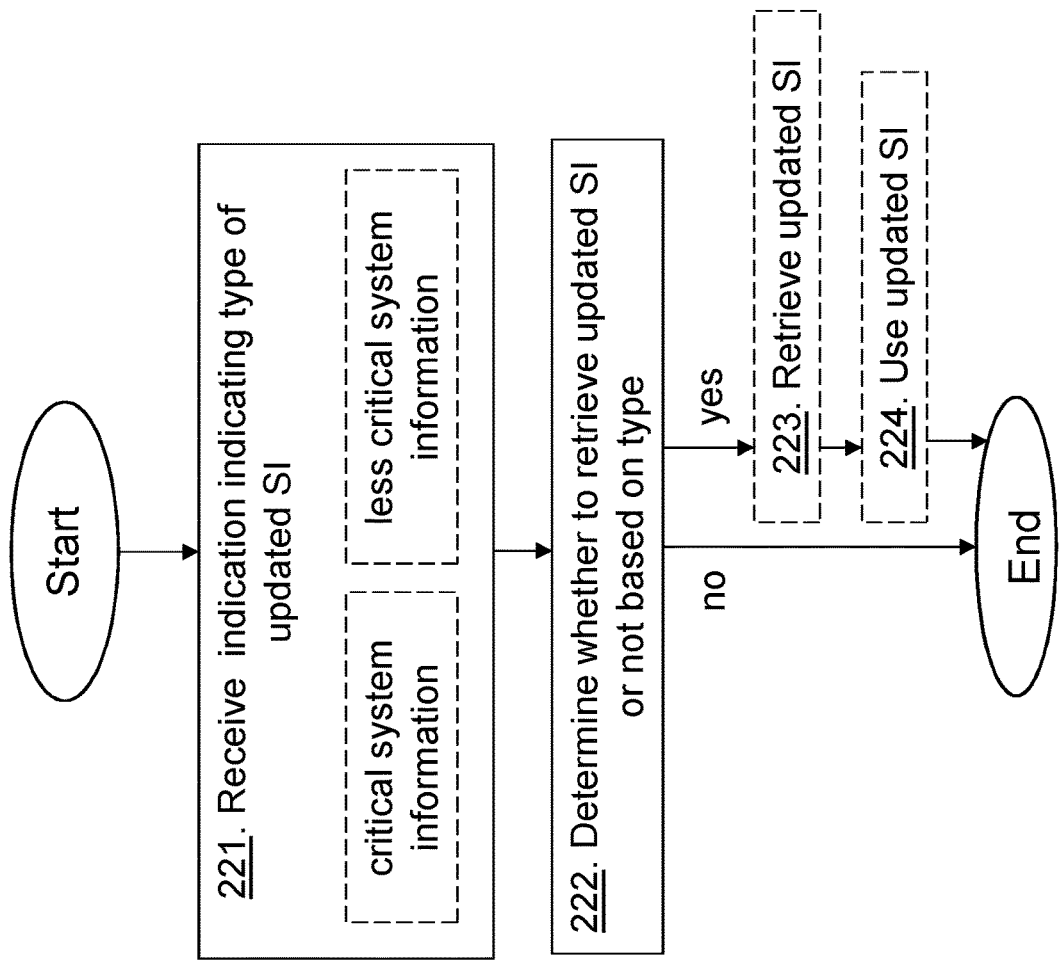
FIG. 2c is a flowchart depicting a method performed by a UE according to embodiments herein.

The method actions performed by the UE 10 for handling system information of the wireless communication network 1 according to embodiments herein will now be described with reference to a flowchart depicted in FIG. 2c. The actions do not have to be taken in the order stated below, but may be taken in any suitable order. Actions performed in some embodiments are marked with dashed boxes.

Action 221.

The UE 10 receives the indication associated with the update of system information of the wireless communication network, wherein the indication indicates the type of system information. The indication may indicate whether the update regards critical system information being a first type of system information, such as general SI, or less critical system information being a second type of system information, such as accessing information. The less critical system information may comprise initiating access information, and the critical system information may comprise paging information.

Action 222.

The UE 10 determines whether to retrieve the updated system information or not based on the indicated type of system information. E.g. the UE 10 may determine whether to retrieve the updated system information or not by determining whether the indicated type of system information is relevant for the UE 10. Alternatively or additionally, the UE 10 may determine whether to retrieve the updated system information or not by taking a timer into account, wherein the timer controls a maximal time the UE 10 is able to postpone acquisition of a certain type of system information. Alternatively or additionally, the UE 10 may determine whether to retrieve the updated system information or not based on whether a condition is fulfilled or not, wherein the condition is related to whether the UE 10: has data for UL transmission, is mobile and/or has a signal strength or quality below a threshold.

Action 223.

The UE 10 may retrieve the updated system information in case determined to retrieve, e.g. the updated SI is critical SI.

Action 224.

The UE 10 may use the retrieved updated system information when communicating with the radio network node 12.

Figure 3:
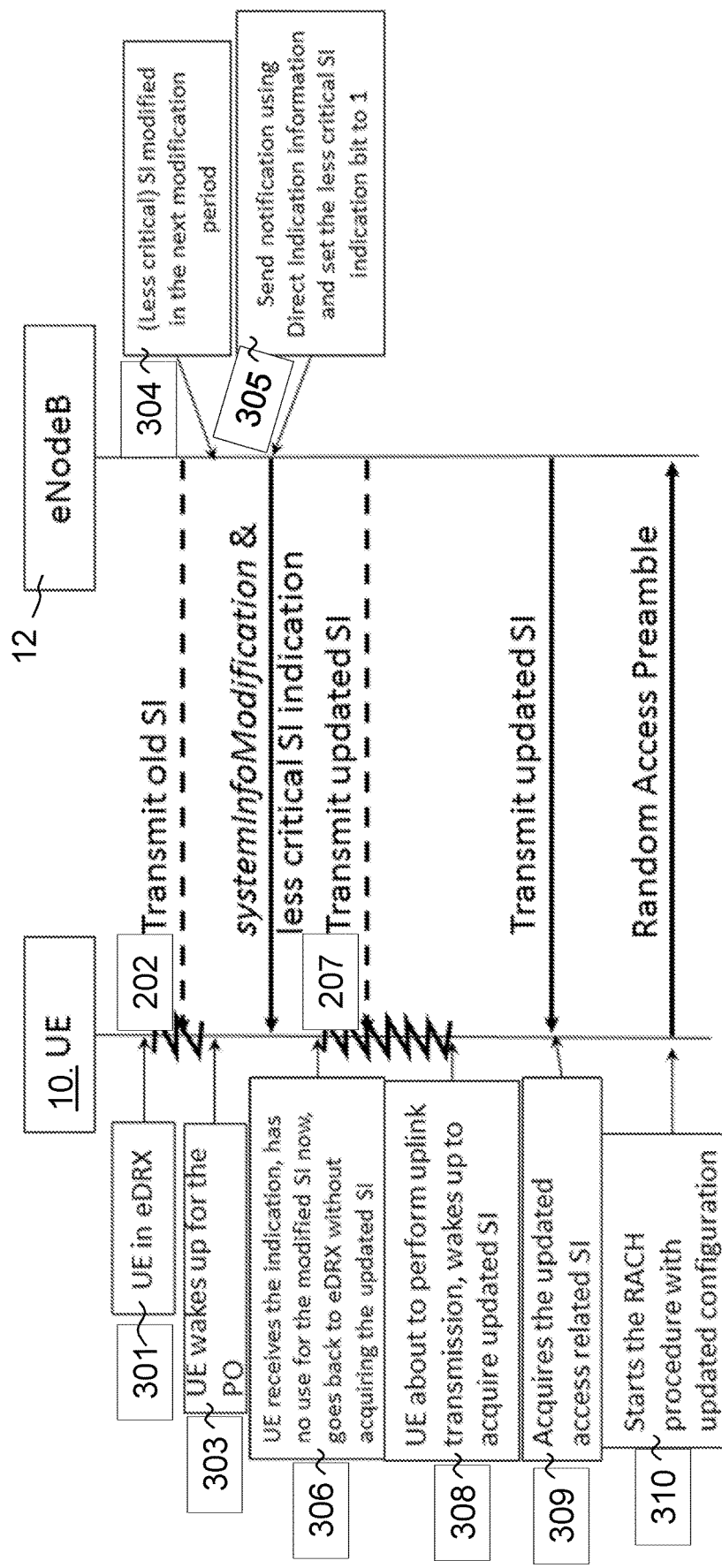
FIG. 3 is a combined flowchart and signalling scheme according to some embodiments herein.

An example scenario of the operation with the less critical SI modification indication can be seen from FIG. 3. FIG. 3 shows an example of the UE operation with the new access related SI modification indication in the Direct Indication information.

Action 301.

The UE 10 may be in an eDRX mode. E.g. in RRC_IDLE state or in RRC_CONNECTED state wherein the UE 10 is configured to use a DRX cycle.

Action 302.

The radio network node 12, exemplified herein as an eNB, transmits periodic SI messages.

Action 303.

The UE 10 wakes up at Paging Occasions (PO) to listen to paging and since the UE 10 has already acquired the "old" SI, therefore it is not required to re-acquire the same SI it already has.

Action 304.

Some less critical SI, e.g. random access information, is modified in the radio network node 12 e.g. in the next modification period.

Action 305.

The radio network node 12 informs the UE 10 about SI modification using e.g. Direct Indication Information transmitted on MPDCCH using P-RNTI on PO without associated Paging message. For example, the systemInfoModification/systemInfoModification-eDRX bit is set to 1, and also a new "lessCriticalSystemInfoModification" bit is set to 1.

Action 306.

The UE 10 receives the SI modification indication and sees from the lessCriticalSystemInfoModification that the SI modification is only related to less critical SI, which the UE 10 does not need to use at the moment e.g. has no data to transmit. Therefore the UE 10 does not have to acquire the updated SI, and can resume to eDRX sleep.

Action 307.

After the SI modification indication, the radio network node 12 starts to transmit the updated SI, which the UE doesn't need to receive at the moment.

Action 308.

The UE 10 is about to transmit data in uplink, therefore the UE 10 needs to receive the up-to-date SI before doing so.

Action 309.

The UE 10 wakes up from eDRX to acquire the updated SI.

Action 310.

After acquiring and applying the new SI, the UE 10 can start the Random Access Channel (RACH) procedure to gain access.

Note: Between actions 306-308 there may be several cycles of actions 304-307, and the power saving results from that the UE 10 does not need to wake up for the action 307 in case only general SI is modified for each cycle.

In one embodiment the sets of SIBs could be configurable some SIBs (or MIB) is associated with general SI and some with less critical SI. If such configuration is not used, the set of less critical, also referred to a non-critical, SI compared to general SI should be fixed. The current listing of various SIBs can be found in TS 36.300 v.14.0.0. The following is the listing for eMTC:

System information is divided into the MasterInformationBlock (MIB) and a number of SystemInformationBlocks (SIBs):

MasterInformationBlock defines the most essential physical layer information of the cell required to receive further system information;

SystemInformationBlockType1 and SystemInformationBlockType1-BR (for a BL UE or UE in enhanced coverage) contain information relevant when evaluating if a UE is allowed to access a cell and define the scheduling of other system information blocks;

SystemInformationBlockType2 contains common and shared channel information;

SystemInformationBlockType3 contains cell re-selection information, mainly related to the serving cell;

SystemInformationBlockType4 contains information about the serving frequency and intra-frequency neighbouring cells relevant for cell re-selection (including cell re-selection parameters common for a frequency as well as cell specific re-selection parameters);

SystemInformationBlockType5 contains information about other E-UTRA frequencies and inter-frequency neighbouring cells relevant for cell re-selection (including cell re-selection parameters common for a frequency as well as cell specific re-selection parameters);

SystemInformationBlockType6 contains information about UTRA frequencies and UTRA neighbouring cells relevant for cell re-selection (including cell re-selection parameters common for a frequency as well as cell specific re-selection parameters);

SystemInformationBlockType7 contains information about GERAN frequencies relevant for cell re-selection (including cell re-selection parameters for each frequency);

SystemInformationBlockType8 contains information about CDMA2000 frequencies and CDMA2000 neighbouring cells relevant for cell re-selection (including cell re-selection parameters common for a frequency as well as cell specific re-selection parameters);

SystemInformationBlockType9 contains a home eNB name (HNB name);

SystemInformationBlockType10 contains an Earthquake and Tsunami Warning System (ETWS) primary notification;

SystemInformationBlockType11 contains an ETWS secondary notification;

SystemInformationBlockType12 contains a Commercial Mobile Alert System (CMAS) warning notification;

SystemInformationBlockType13 contains Multimedia Broadcast Multicast Services (MBMS)-related information;

SystemInformationBlockType14 contains information about Extended Access Barring for access control;

SystemInformationBlockType15 contains information related to mobility procedures for MBMS reception;

SystemInformationBlockType16 contains information related to GPS time and Coordinated Universal Time (UTC);

SystemInformationBlockType17 contains information relevant for traffic steering between E-UTRAN and WLAN;

SystemInformationBlockType18 contains information related to sidelink communication;

SystemInformationBlockType19 contains information related to sidelink discovery;

SystemInformationBlockType20 contains information related to Single Cell Point to Multipoint (SC-PTM).

SystemInformationBlockType21 contains information related to Vehicle to Everything (V2X) sidelink communication.

Figure 4:
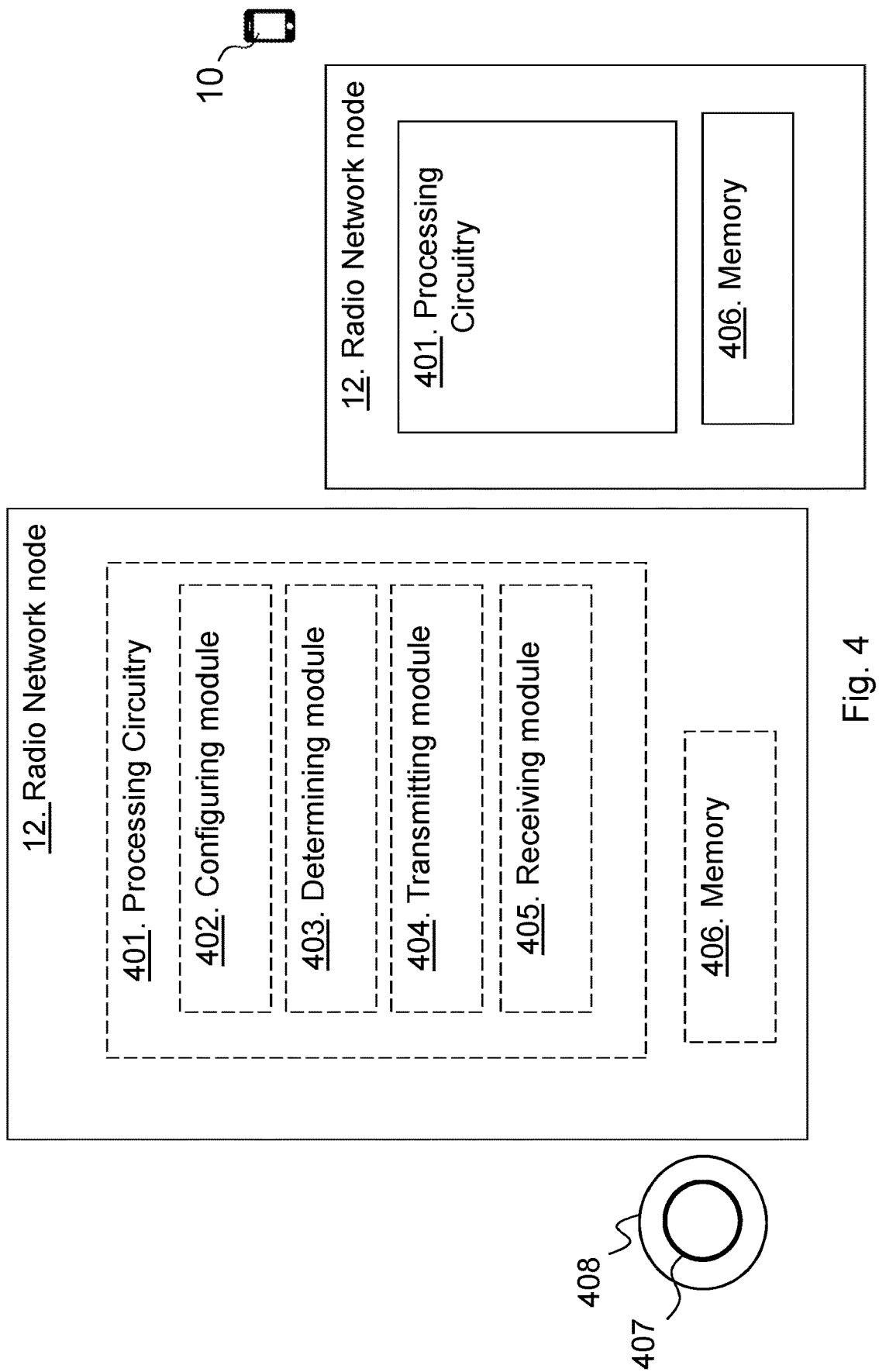
FIG. 4 is a schematic block diagram depicting a network node according to embodiments herein.

FIG. 4 is a schematic block diagram depicting the radio network node 12 for enabling communication e.g. providing at least part of the system information, for the UE in the wireless communication network 1.

The radio network node 12 may comprise processing circuitry 401, e.g. one or more processors, configured to perform the methods herein.

The radio network node 12 may comprise a configuring module 402. The radio network node 12, the processing circuitry 401, and/or the configuring module 402 may be configured to configure the UE 10 with configuration data defining types of SI, e.g. which SIBs are general SI, less critical etc.

The radio network node 12 may comprise a determining module 403. The radio network node 12, the processing circuitry 401, and/or the determining module 403 may be configured to determine to update at least a part of the SI. The radio network node 12, the processing circuitry 401, and/or the determining module 403 may further be configured to determine the type of SI that is updated.

The radio network node 12 may comprise a transmitting module 404, e.g. a transmitter, a transceiver, or similar. The radio network node 12, the processing circuitry 401, and/or the transmitting module 404 is configured to transmit the indication associated with the update of SI of the wireless communication network 1 to the UE 10, wherein the indication indicates the type of SI being updated. The indication may indicate whether the update regards critical system information being a first type of system information, or less critical system information being a second type of system information. The radio network node 12, the processing circuitry 401, and/or the determining module 403 may further be configured to transmit the updated SI or part of the SI within the cell 11.

The radio network node 12 may comprise a receiving module 405, e.g. a receiver or a transceiver. The radio network node 12, the processing circuitry 401, and/or the receiving module 405 may be configured to receive a transmission from the UE 10 using the updated SI.

The radio network node 12 further comprises a memory 406 comprising one or more memory units. The memory 406 comprises instructions executable by the processing circuitry 401 to perform the methods herein when being executed in the radio network node 12. The memory 406 is arranged to be used to store e.g. information, data such as configurations, types of SIs, SI, indications, etc.

The methods according to the embodiments described herein for the radio network node 12 are respectively implemented by means of e.g. a computer program product 407 or a computer program, comprising instructions, i.e., software code portions, which, when executed on at least one processor, cause the at least one processor to carry out the actions described herein, as performed by the radio network node 12. The computer program product 407 may be stored on a computer-readable storage medium 408, e.g. a disc, a universal serial bus (USB) stick, or similar. The computer-readable storage medium 408, having stored thereon the computer program product, may comprise the instructions which, when executed on at least one processor, cause the at least one processor to carry out the actions described herein, as performed by the radio network node 12. In some embodiments, the computer-readable storage medium may be a non-transitory computer-readable storage medium. Thus, the radio network node 12 may comprise the processing circuitry and the memory, said memory comprising instructions executable by said processing circuitry whereby said radio network node is operative to perform the methods herein. The radio network node 12 may comprise a communication interface such as transmitter, receiver and/or one or more antennas.

Figure 5:
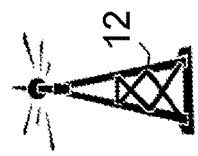
FIG. 5 is a schematic block diagram depicting a UE according to embodiments herein.
Figure 5:
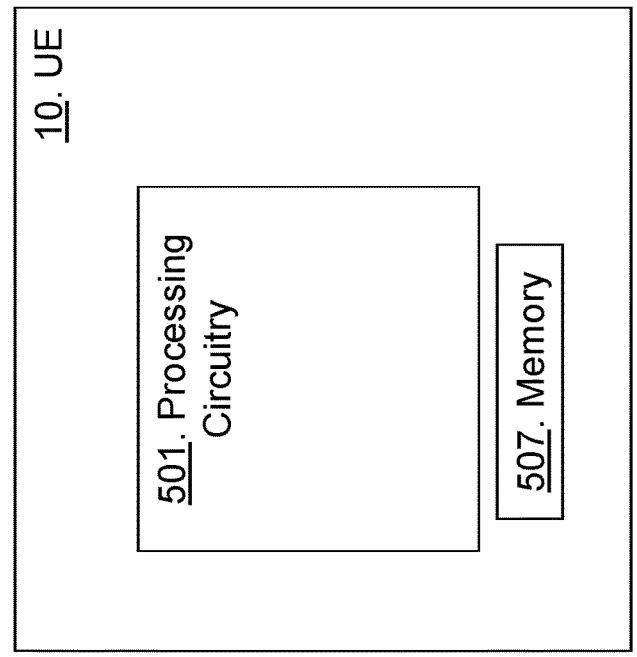
Figure 5:
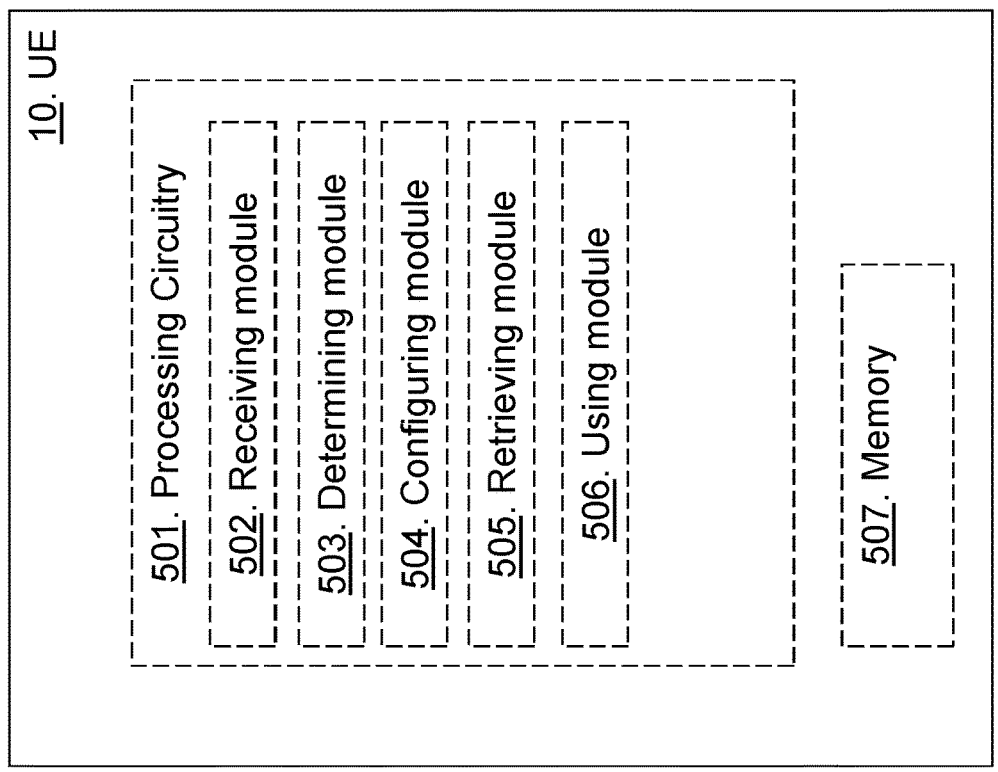
Figure 5:
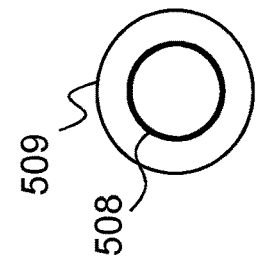

FIG. 5 is a schematic block diagram depicting the UE 10 for handling communication in the wireless communication network according to embodiments herein.

The UE 10 may comprise processing circuitry 501, e.g. one or more processors, configured to perform the methods herein.

The UE 10 may comprise a receiving module 502, e.g. a receiver, a transceiver or similar. The UE 10, the processing circuitry 501, and/or the receiving module 502 is configured to receive the indication associated with the update of SI of the wireless communication network 1 from the radio network node 12, wherein the indication indicates a type of updated SI. The indication may indicate whether the update regards critical system information being a first type of system information, or less critical system information being a second type of system information.

The UE 10 may comprise a determining module 503. The UE 10, the processing circuitry 501, and/or the determining module 503 is configured to determine whether to retrieve the updated system information or not based on the indicated type of system information. The UE 10, the processing circuitry 501, and/or the determining module 503 may be configured to determine whether the type of SI updated is relevant for the UE 10. The UE 10, the processing circuitry 501, and/or the determining module 503 may be configured to determine whether to retrieve the updated system information or not is further taking a timer into account, wherein the timer controls a maximal time the user equipment 10 is able to postpone acquisition of a certain type of system information. The UE 10, the processing circuitry 501, and/or the determining module 503 may be configured to determine whether to retrieve the updated system information or not based on whether a condition is fulfilled or not, wherein the condition is related to whether the user equipment 10: has data for uplink transmission, is mobile and/or has a signal strength or quality below a threshold. That is, the UE 10, the processing circuitry 501, and/or the determining module 503 may be configured to determine to update the SI based on the type indicated by the indication. For example, the UE 10, the processing circuitry 501, and/or the determining module 503 may be configured to determine to retrieve the updated SI information in case the type is a General SI. In another example, the UE 10, the processing circuitry 501, and/or the determining module 503 may be configured to determine to omit retrieving the updated SI in that the type is determined not applicable for the UE 10. In some embodiments the determination to retrieve the updated SI or not is further taking the timer into account. The timer controls the maximal time the UE 10 can postpone the acquisition of a certain type of SI e.g. less critical SI.

The UE 10 may comprise a configuring module 504. The UE 10, the processing circuitry 501, and/or the configuring module 504 may be configured, from the radio network node 12 or be pre-configured, with definition of the types of SI and when a condition is fulfilled to mean the type is not relevant or is relevant for the UE 10. The condition may state that the UE 10 comprises data for UL transmission, being mobile or having signal strength or quality below a threshold.

The UE 10 may comprise a retrieving module 505. The UE 10, the processing circuitry 501, and/or the retrieving module 505 may be configured to retrieve the updated SI in case determined to retrieve. The SI or part of SI may be periodically transmitted in the cell.

The UE 10 may comprise a using module 506. The UE 10, the processing circuitry 501, and/or the using module 506 may be configured to use the retrieved updated SI when communicating with the radio network node 12.

The UE 10 further comprises a memory 507 comprising one or more memory units. The memory 507 comprises instructions executable by the processing circuitry 501 to perform the methods herein when being executed in the UE 10. The memory 507 is arranged to be used to store e.g. information, data such as configurations, types of SI, SI, indications etc.

The methods according to the embodiments described herein for the UE 10 are respectively implemented by means of e.g. a computer program product 508 or a computer program, comprising instructions, i.e., software code portions, which, when executed on at least one processor, cause the at least one processor to carry out the actions described herein, as performed by the UE 10. The computer program product 508 may be stored on a computer-readable storage medium 509, e.g. a disc, a universal serial bus (USB) stick or similar. The computer-readable storage medium 509, having stored thereon the computer program product, may comprise the instructions which, when executed on at least one processor, cause the at least one processor to carry out the actions described herein, as performed by the UE 10. In some embodiments, the computer-readable storage medium may be a non-transitory computer-readable storage medium. Thus, the UE 10 may comprise the processing circuitry and the memory, said memory comprising instructions executable by said processing circuitry whereby said UE is operative to perform the methods herein. The UE may comprise communication interface such as transmitter, receiver and/or one or more antennas.

As will be readily understood by those familiar with communications design, means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It is herein disclosed a method performed by a radio network node for handling system information of a wireless communication network. The radio network node transmits, to a user equipment, an indication associated with an update of system information of the wireless communication network, wherein the indication indicates type of system information. The indication may indicate whether the update regards critical system information or less critical system information.

It is further herein disclosed a method performed by user equipment for handling system information of a wireless communication network. The user equipment receives an indication associated with an update of system information of the wireless communication network, wherein the indication indicates type of system information. The user equipment determines whether to retrieve the updated system information based on the indicated type of system information.

Figure 6:
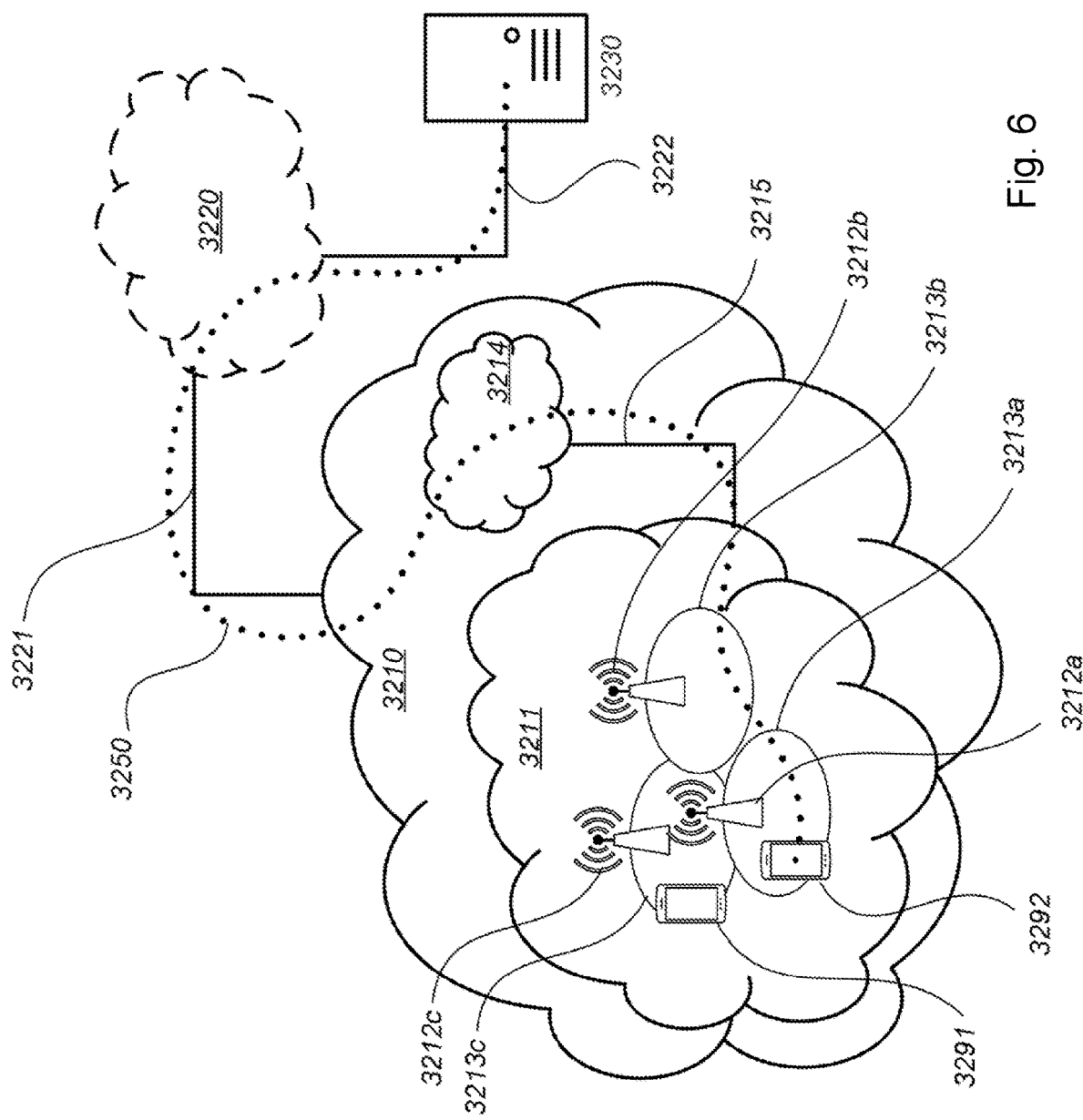
FIG. 6 schematically illustrates a telecommunication network connected via an intermediate network to a host computer.

With reference to FIG. 6, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 6 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 7. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 7) served by the base station 3320. The communication interface 3326 may be configured to facilitate a connection 3360 to the host computer 3310. The connection 3360 may be direct or it may pass through a core network (not shown in FIG. 7) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 7:
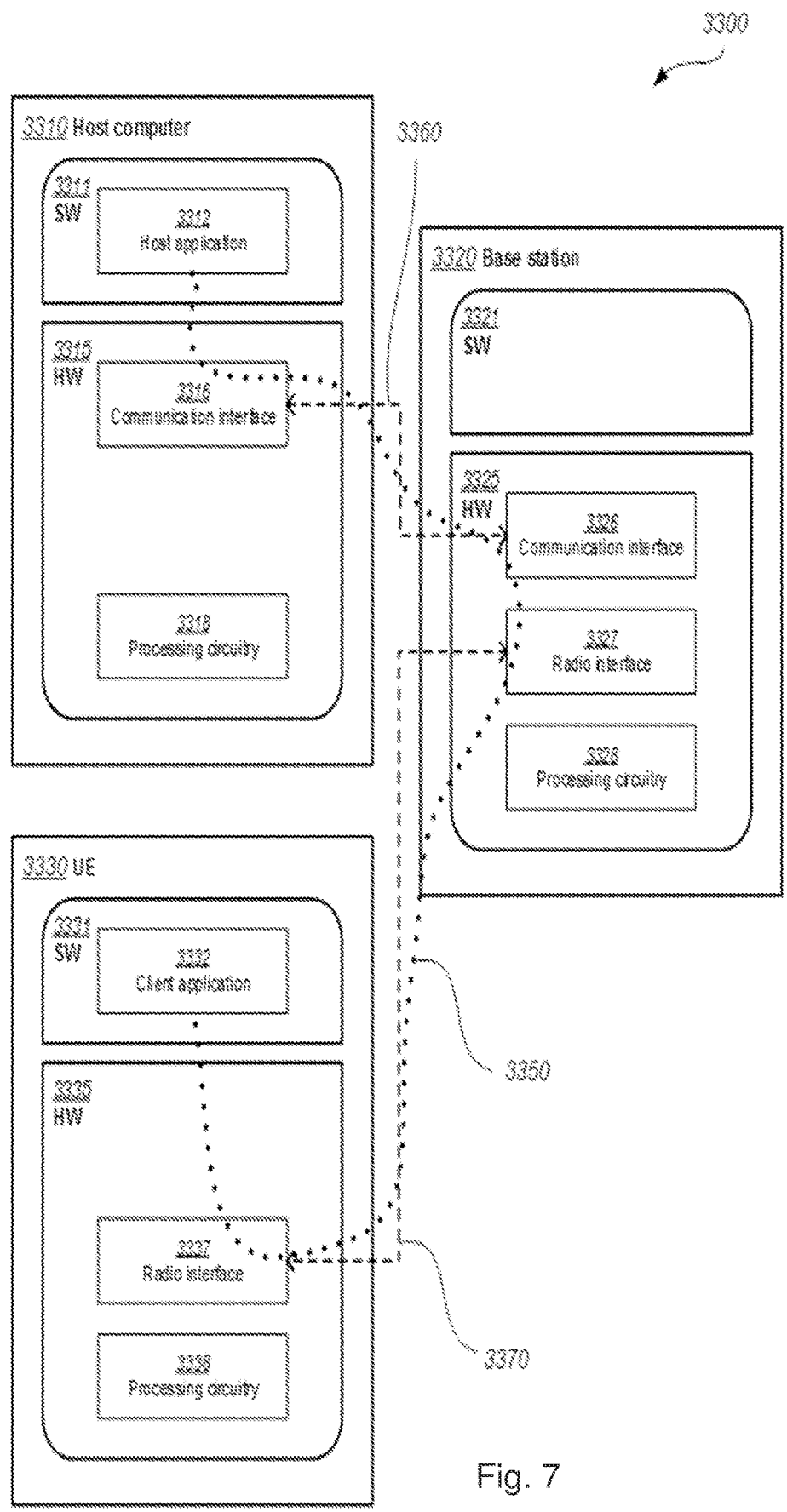
FIG. 7 is a generalized block diagram of a host computer communicating via a base station with a user equipment over a partially wireless connection.

It is noted that the host computer 3310, base station 3320 and UE 3330 illustrated in FIG. 7 may be identical to the host computer 3230, one of the base stations 3212a, 3212b, 3212c and one of the UEs 3291, 3292 of FIG. 6, respectively. This is to say, the inner workings of these entities may be as shown in FIG. 7 and independently, the surrounding network topology may be that of FIG. 6.

In FIG. 7, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve battery time at the UE and thereby provide benefits such as prolonged user time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method, performed by a radio network node, for handling system information of a wireless communication network, the method comprising the radio network node:
  transmitting, to a user equipment, an indication associated with an update of system information of the wireless communication network;
  wherein the indication comprises multiple bits indicating a type of system information;
  wherein a value of a first bit in the indication indicates a change in a first type of system information; and
  wherein a value of a second bit in the indication indicates a change in a second type of system information.

2. The method of claim 1, wherein the indication indicates whether the update regards critical system information being first type of system information, or less critical system information being the second type of system information.

3. The method of claim 2:
  wherein the less critical system information comprises initiating access information; and
  wherein the critical system information comprises paging information.

4. A method, performed by a user equipment, for handling system information of a wireless communication network, the method comprising the user equipment:
  receiving a control message on a downlink control channel, the control message including a paging identifier and an indication associated with an update of system information of the wireless communication network, wherein
    the indication comprises multiple bits indicating a type of system information that has changed;
    a value of a first bit in the indication indicates a change in a first type of system information; and
    a value of a second bit in the indication indicates a change in a second type of system information; and
  determining whether to retrieve the updated system information or not based on the values of the first and second bits in the indication.

5. The method of claim 4, wherein the determining whether to retrieve the updated system information or not comprises determining whether the indicated type of system information is relevant for the user equipment.

6. The method of claim 4, wherein the determining whether to retrieve the updated system information or not comprises taking a timer into account, wherein the timer controls a maximal time the user equipment is able to postpone acquisition of a certain type of system information.

7. The method of claim 4:
  wherein the determining whether to retrieve the updated system information or not is based on whether a condition is fulfilled or not;
  wherein the condition is related to whether the user equipment: has data for uplink transmission, is mobile, and/or has a signal strength or quality below a threshold.

8. The method of claim 4, wherein the indication indicates whether the update regards critical system information being the first type of system information, or less critical system information being the second type of system information.

9. The method of claim 8:
  wherein the less critical system information comprises initiating access information; and
  wherein the critical system information comprises paging information.

10. The method of claim 4, further comprising
  retrieving the updated system information in response to determining to retrieve the updated system information; and
  using the retrieved updated system information when communicating with a radio network node.

11. A radio network node for handling system information of a wireless communication network, the radio network node comprising:
  processing circuitry;
  memory containing instructions executable by the processing circuitry whereby the radio network node is operative to:
    transmit, to a user equipment, an indication associated with an update of system information of the wireless communication network;
    wherein the indication indicates a type of system information that has changed;
    wherein a value of a first bit in the indication indicates a change in a first type of system information; and
    wherein a value of a second bit in the indication indicates a change in a second type of system information.

12. The radio network node of claim 11, wherein the indication indicates whether the update regards critical system information being a first type of system information, or less critical system information being a second type of system information.

13. The radio network node of claim 12:
  wherein the less critical system information comprises initiating access information; and
  wherein the critical system information comprises paging information.

14. A user equipment for handling system information of a wireless communication network, the user equipment comprising:
  processing circuitry;
  memory containing instructions executable by the processing circuitry whereby the user equipment is operative to:
    receive a control message on a downlink control channel, the control message including a paging identifier and an indication associated with an update of system information of the wireless communication network, wherein:
      the indication comprises multiple bits indicating a type of system information that has changed;
      a value of a first bit in the indication indicates a change in a first type of system information;
      a value of a second bit in the indication indicates a change in a second type of system information; and determine whether to retrieve the updated system information or not based on the indicated type of system information.

15. The user equipment of claim 14, wherein the instructions are such that the user equipment is operative to determine whether to retrieve the updated system information or not by determining whether the indicated type of system information is relevant for the user equipment.

16. The user equipment of claim 14, wherein the instructions are such that the user equipment is operative to determine whether to retrieve the updated system information or not by taking a timer into account, wherein the timer controls a maximal time the user equipment is able to postpone acquisition of a certain type of system information.

17. The user equipment of claim 14:
wherein the instructions are such that the user equipment is operative to determine whether to retrieve the updated system information or not based on whether a condition is fulfilled or not;
wherein the condition is related to whether the user equipment: has data for uplink transmission, is mobile, and/or has a signal strength or quality below a threshold.

18. The user equipment of claim 14, wherein the indication indicates whether the update regards critical system information being the first type of system information, or less critical system information being the second type of system information.

19. The user equipment of claim 18:
wherein the less critical system information comprises initiating access information; and
wherein the critical system information comprises paging information.

20. The user equipment of claim 14, wherein the instructions are such that the user equipment is operative to:
retrieve the updated system information in response to determining to retrieve the updated system information; and
use the retrieved updated system information when communicating with a radio network node.

21. The method of claim 14 further comprising retrieving the first type of system information when the first bit indicates a change in the first type of system information.

22. The method of claim 21 further comprising waiting until system access is needed to retrieve the second type of system information when the first bit indicates that the first type of system information is unchanged and the second bit indicates a change in the second type of system information.

23. The radio network node of claim 14 being further operative retrieve to the first type of system information when the first bit indicates a change in the first type of system information.

24. The radio network node of claim 23 being further operative to wait until system access is needed to retrieve the second type of system information when the first bit indicates that the first type of system information is unchanged and the second bit indicates a change in the second type of system information.

* * * * *